June 14, 1927.
W. T. BENHAM ET AL
1,632,428
SAFE LOCKING MECHANISM
Filed May 16, 1924
5 Sheets-Sheet 1
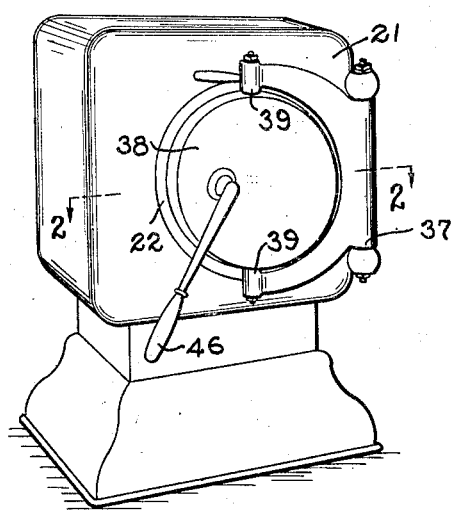
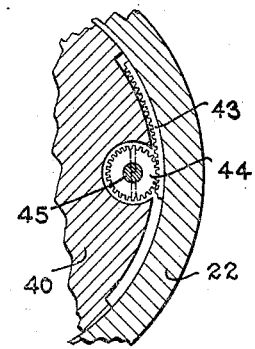
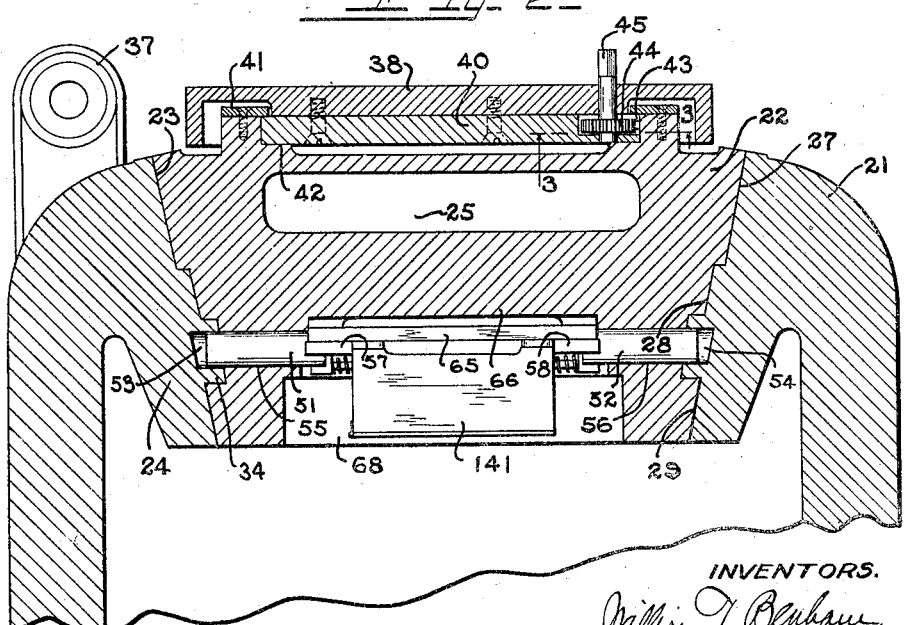
INVENTORS.

June 14, 1927.
W. T. BENHAM ET AL
1,632,428
SAFE LOCKING MECHANISM
Filed May 16, 1924
5 Sheets-Sheet 2
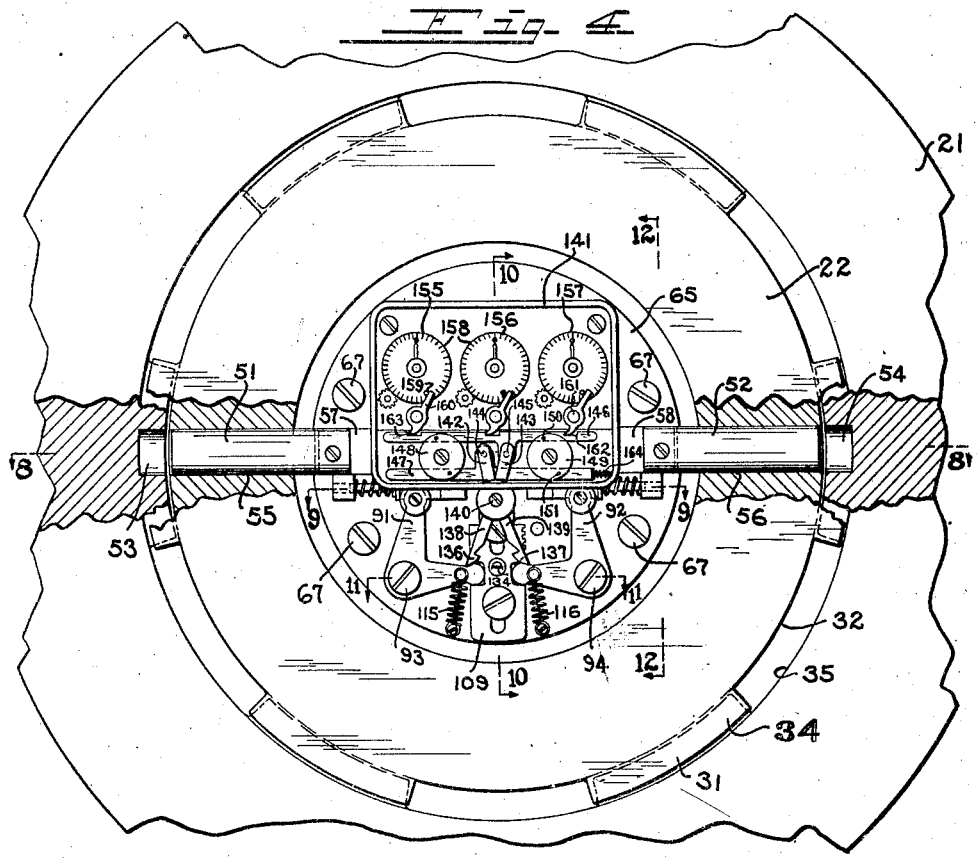
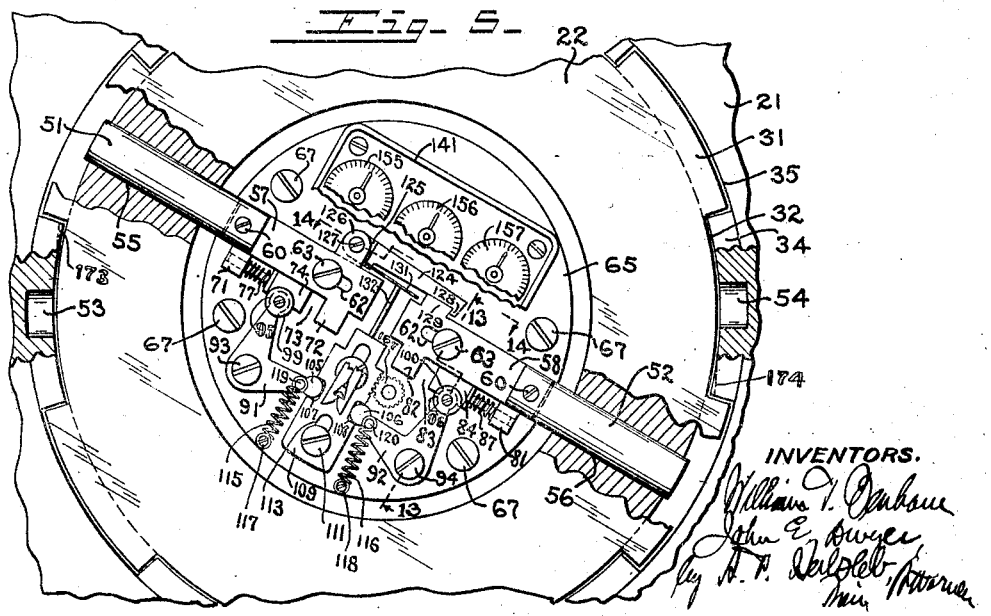
INVENTORS.

June 14, 1927.

W. T. BENHAM ET AL 1,632,428

SAFE LOCKING MECHANISM

Filed May 16, 1924

INVENTORS.

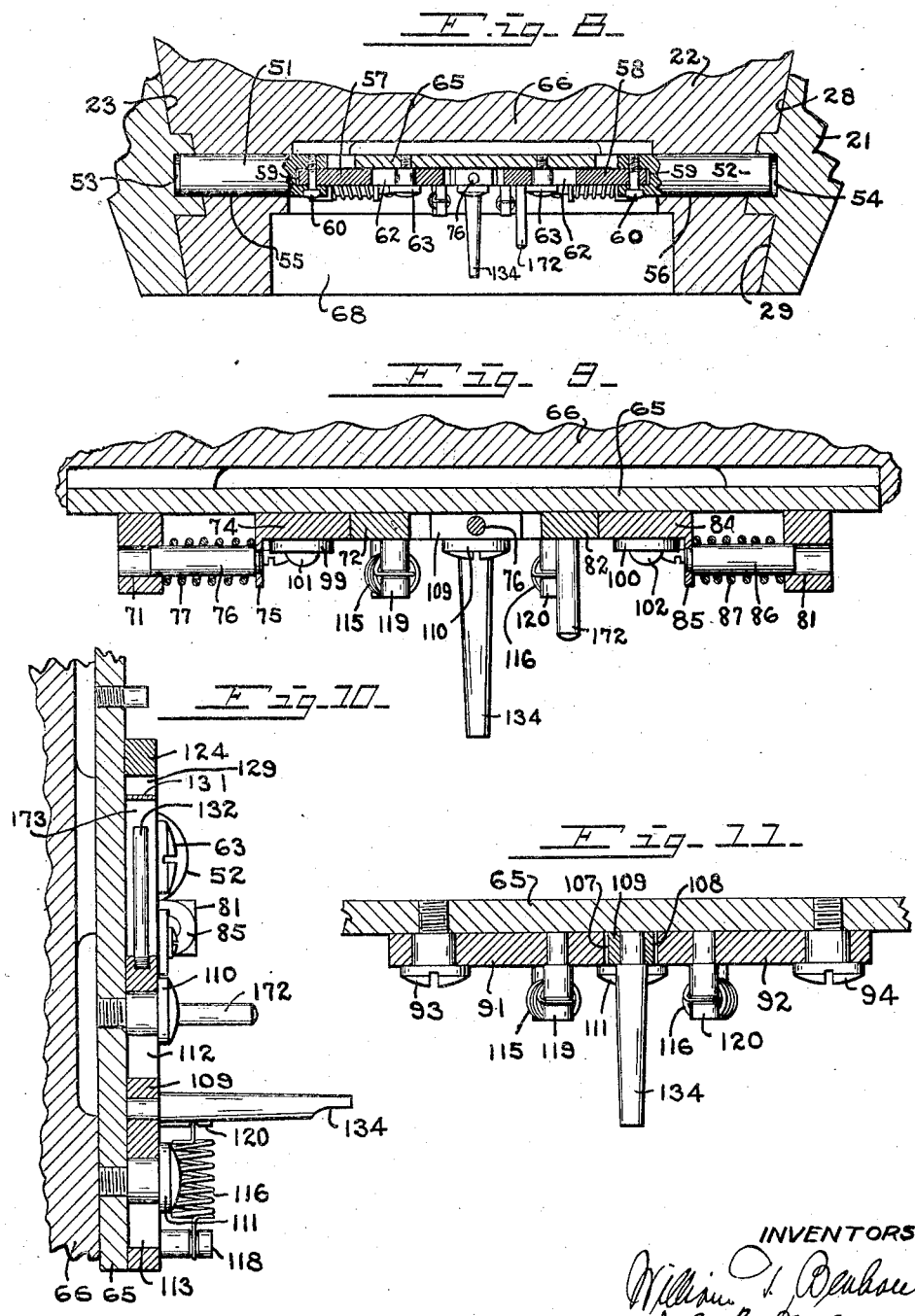

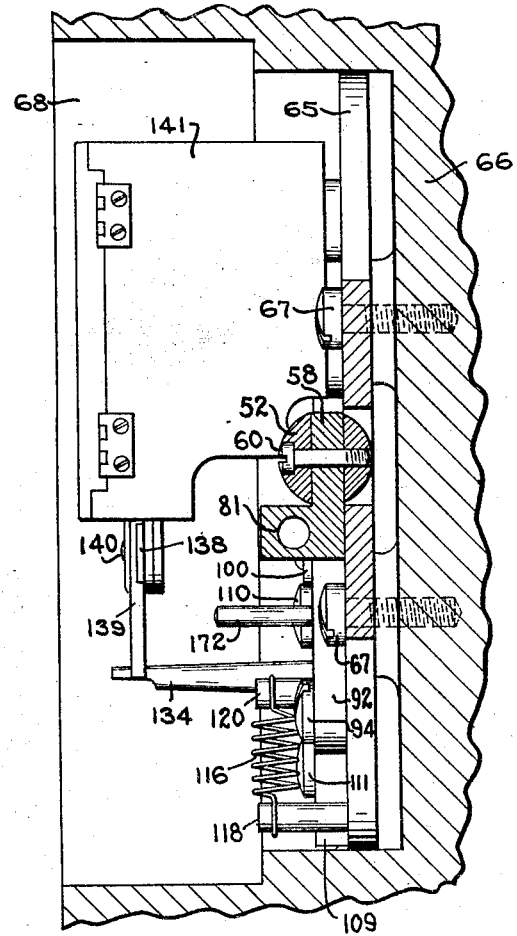
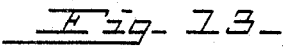
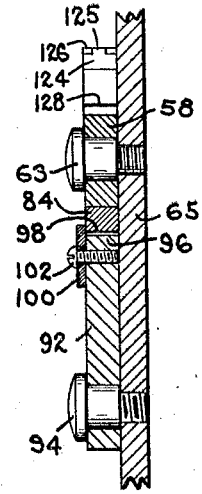
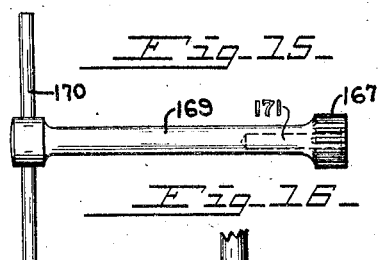
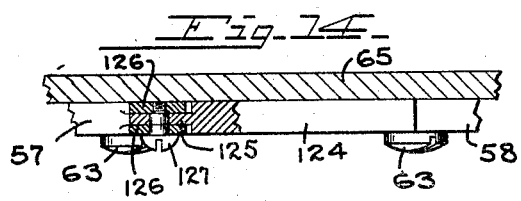
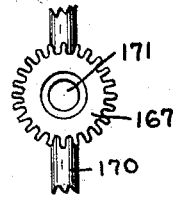

Patented June 14, 1927.                                                                1,632,428

UNITED STATES PATENT OFFICE.

WILLIAM T. BENHAM, OF NORWOOD, AND JOHN E. DWYER, OF CINCINNATI, OHIO, ASSIGNORS TO THE HALL'S SAFE COMPANY, OF CINCINNATI, OHIO, A CORPORATION OF OHIO.

SAFE-LOCKING MECHANISM.

Application filed May 16, 1924.  Serial No. 713,770.

This invention relates to locking mechanism employable in safes, including vaults and the like, especially to such locking mechanism in connection with time mechanism.

The invention is exemplified in connection with time mechanism for a so-called round-door safe.

It is the object of the invention to provide novel means whereby the bolt mechanism when placed in locking relation is maintained in locking relation regardless of the position into which the safe may be placed, whether upright, upside down, on its face, on its back, or in other position; and, further, to provide novel mechanism whereby the bolt mechanism is maintained in locking relation despite jars to which the safe may be subjected directed in any direction upon the safe and regardless of the position in which the safe may be placed when subjected to such jars.

It is the object of the invention, further, to provide novel means which act counter to each other to resist movements in the mechanism; further, to provide oppositely moving elements of similar character so arranged that jarring of one of the elements in an unlocking direction will cause jarring of its opposite element in locking direction; further, to provide novel opposingly disposed elements arranged to be moved in opposite directions for releasing the door; further, to provide novel opposingly disposed elements arranged to be moved in opposite directions for effecting locking positioning of the bolts; further, to provide a unitary element for effecting such locking positioning; and, further, to provide novel means for holding the bolts in unlocked relation while being urged in locking direction, and for releasing said bolts for locking relation of the same.

The invention will be further readily understood from the following description and claims, and from the drawings; in which latter:

Fig. 1 is a perspective view of a round-door safe, having the invention applied thereto.

Fig. 2 is a horizontal cross-section of the same, taken on a line corresponding to the line 2—2 of Fig. 1, and with the outer handle for rotating the door omitted.

Fig. 3 is a cross-sectional detail of the same, taken in the plane of the line 3—3 of Fig. 2.

Fig. 4 is a rear elevation of the invention, shown in connection with a time mechanism, and as applied to the door of a round-door safe, the body of the safe, the door and the wall of the door-opening being partly broken away, and showing the door of the casing of the time mechanism removed, the bolt-works being in unlocked position immediately subsequent to the unlocking of the same by the time mechanism.

Fig. 5 is a similar view, partly broken away, showing the bolt mechanism set for locking of the door, but latched in open relation, and with the door closed, but prior to rotation of the door for locking the same.

Figure 6:
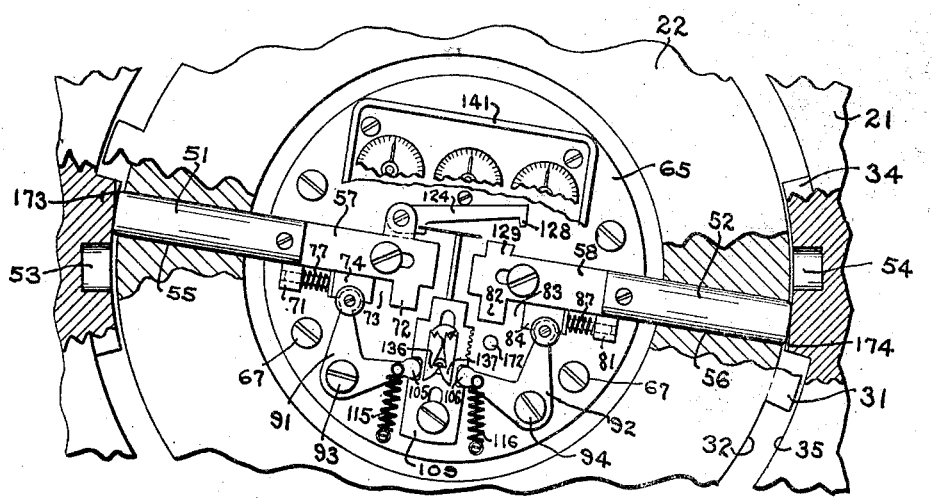

Fig. 6 is a similar view, but showing the door partly rotated and the bolt mechanism unlatched.

Figure 7:
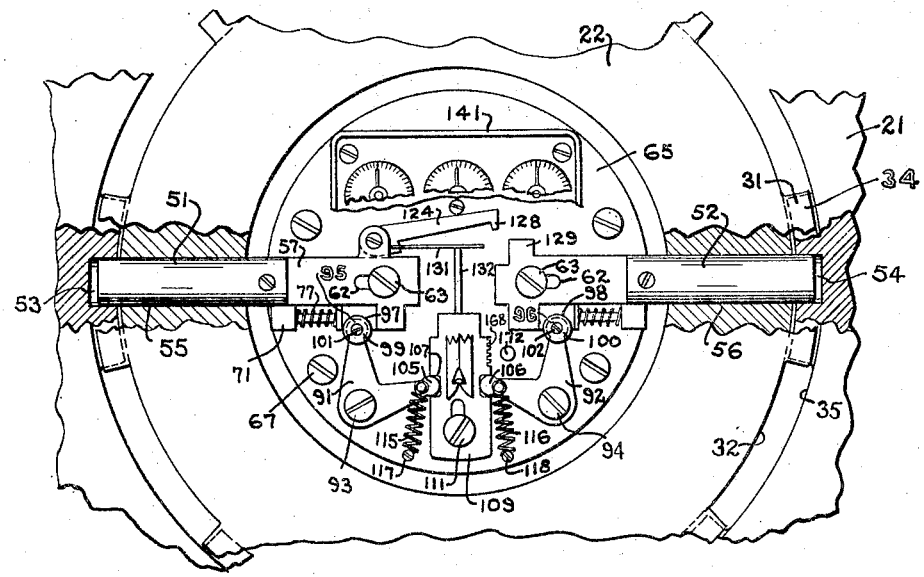

Fig. 7 is a similar view, showing the bolt mechanism locked.

Fig. 8 is a horizontal cross-section of the same, with the time mechanism omitted, and taken in the plane of the line 8—8 of Fig. 4.

Fig. 9 is a horizontal cross-section, of the same, taken on the line 9—9 of Fig. 4.

Fig. 10 is a vertical cross-section of the same, taken on the line 10—10 of Fig. 4.

Fig. 11 is a horizontal cross-section of the same, taken on the line 11—11 of Fig. 4.

Fig. 12 is a vertical cross-section of the same, shown in connection with the time mechanism, and taken on the line 12—12 of Fig. 4.

Fig. 13 is a cross-section of a detail of the same, taken on the irregular line 13—13 of Fig. 5.

Fig. 14 is a cross-section of a detail, taken on the line 14—14 of Fig. 5.

Fig. 15 is a side elevation of the operating handle for the bolt works; and,

Fig. 16 is an end elevation of the same.

The safe 21 may be of any ordinary or usual construction, and the door 22 may likewise be of any ordinary or usual construction. The safe may be an integral burglar-proof safe comprising an integral body of burglar-proof metal, and be provided with a storing cavity, having a mouth or door opening arranged to be closed by the door.

The door opening is exemplified at 23, having a wall 24, which is shown as an annular wall, for receiving the door 22, which is exemplified as a round door. The door may be provided with a protective cavity 25 for well-known purposes, and with usual day-lock mechanism suitably placed.

The door is exemplified as a stepped door provided with steps 27, 28 and 29, of different diameters and shown as frusto-conical in shape. The inner end of the door at the inner end of the inner step thereof may be provided with lugs 31 having spaces 32 between them.

The wall of the door opening is provided with corresponding steps of similar form, with which the steps 27, 28 and 29, are arranged to form close contact for securely closing the door. The outer end of the inner step of the wall of the door opening is provided with lugs 34 having spaces 35 between them.

The door is suitably hinged for swinging into the door opening, as by a hinge mechanism 37, and is rotatably supported, as by providing an outer plate 38 having pintles 39 for the hinge mechanism, an inner plate 40 fixed to the outer plate, and an annular flange-ring 41 fixed to the door, the flange-ring being received about the outer periphery of the inner plate, the inner plate being journaled in a recess 42 in the door. The wall of the recess is provided with an arcuate rack 43, and the plates with a pinion 44 on a shaft 45 journaled in the plates, and arranged for having an outer operating handle 46 received about its outer end for rotating the pinion and door.

When closing the door, the door is swung inwardly on the hinge mechanism for permitting the lugs 31 on the door to pass through the spaces 35 in the wall of the door opening, the door being then rotated to locate the lugs 31 on the door in rear of the lugs 34 in the wall of the door opening for drawing the door inwardly and holding the same against outward movement, in usual manner.

Bolts 51, 52, on the door are arranged to be received in bolt holes 53, 54, in the wall of the door opening. These holes are located in the lugs 34 in the wall of the door opening. The bolts and the holes are each exemplified as two in number, although the number of the same is immaterial for the purposes of the invention.

The bolts are exemplified as having axial movement in bearings 55, 56, in the door, so as to project beyond the door into the holes 53, 54, in the wall of the door opening, for locking the door, or to be withdrawn within the outer periphery of the door for unlocking the door. The bolts are exemplified as located in the step 28 of the door to coact with the lugs 31 in the wall of the door opening.

The bolts are provided with inward extensions 57, 58, shown as plates having attachment with the bolts by being received in slots 59, in the inner ends of the bolts, and having screws 60, connecting the walls of the slots with the outer ends of the plates. The plates are provided with slots 62, in which shoulder-screws 63, are received, the shoulder-screws being threaded into a plate 65, shown secured to the rear wall 66 of the door by bolts 67. This rear wall is shown as the front wall of a recess 68 in the rear end of the door in which the bolt-actuating mechanism is located.

The plate 57 is provided with a bearing 71 and a lug 72 to form a recess 73 between them. A slide 74 is located in the recess, and comprises a flange 75, from which a stem 76 projects into the bearing 71, a spring 77 being received about the stem between the flange and the bearing for normally urging the bolt in locking direction.

The plate 58 is provided with corresponding parts, the bearing being shown at 81, the lug at 82, the recess at 83, the slide at 84, having the flange 85 with the stem 86 projecting therefrom and sliding axially in the bearing 81, a spring 87 being located between the flange and the bearing.

Levers 91, 92, are represented as bell-crank levers, pivoted on shoulder-screws 93, 94, threaded into the plate 65. These respective levers have knuckles 95, 96, respectively received in knuckle-recesses 97, 98, in the slides 74, 84. Disks 99, 100, are secured to the knuckles for holding the slides in place between said disks and the plate 65, while permitting endwise movements of the slides with relation to the bolts, the slides being actuated by the levers. Shoulder-screws 101, 102, hold the disks rotatively to the levers.

The other ends of the levers are provided with knuckles 105, 106, received in knuckle-recesses 107, 108, of a slide 109. This slide is held slidingly in place with relation to the plate 65 by means of shoulder-screws 110, 111, received through slots 112, 113, in the slide, and threaded into said plate.

Springs 115, 116, have their respective ends attached to screws 117, 118, threaded into said plate and pins 119, 120, on the levers 91, 92, for normally retracting the levers and moving the bolts into unlocking position.

A latch 124 is pivoted to one of the bolts and is arranged to have latching engagement with the opposing bolt. This latch is shown as having a pivot flange 125, located between pivot flanges 126, on the plate 57, a screw 127 being received through said flanges for serving as the pivot. The latch is provided with a hook 128 arranged to coact with the lug 129 of the plate 58, this lug being shown formed projecting from said plate, the outer end of the lug forming a riding surface for the latch and a shoulder for the hook 128.

The latch is arranged to be actuated by the slide 109 which actuates the bolts, preferably in such manner that engagement between the hook 128 and the shoulder 129 will hold the latch in latching relation, when there is pressure exerted on the bolts to urge them into locking relation, with the latch arranged to move into unlatching relation when the friction or holding action between the hook and the shoulder is released.

This in the present instance is effected by providing the latch with a spring 131, shown as a leaf-spring, arranged to be contacted by a stem 132 extending from the slide 109.

The slide 109 is provided with a part arranged to be held, shown as an arm 134, projecting from the slide, and means are provided for engagement with this part to hold the slide in actuated relation for urging the bolts into locking relation, these holding means being arranged to be released for moving the bolts into unlocking relation.

These holding means are exemplified as comprising oppositely acting latches 136, 137, located on levers 138, 139, pivoted on a pivot-screw 140, in a lug depending from the clock-casing 141, secured to the plate 65. The lever 138 has an arm 142, and the lever 139 has an arm 143. The arms have articulation by pins 144, 145, with bars 146, 147, slidable in the clock casing. The bars are connected for simultaneous but opposite movements by means of disks 148, 149, articulated to the bar 146 by pins 150 and to the bar 147 by pins 151.

The actuation of the bars is controlled by the time clocks, three of which are shown respectively at 155, 156, 157, provided with usual dials 158, having thereon knock-out pins 159. The knock-out pins are arranged to actuate knock-out levers 160, pivoted to the time casing on pins 161, one end of the levers being in range of the pins and the other end of the levers being received in slots 162, of the bar 146, and arranged to contact the end walls 163 of said slots, which serve as shoulders, for moving the bar 146 endwise, when the knock-out pins move the levers for actuating the bars, and consequently the holding devices, into release position, whereby the latches 136, 137, are moved into disengaging relation with the arm 134, for causing retraction of the slide 109 and unlocking of the bolt works.

The bars 146, 147, are normally retracted to initial positions by suitable spring mechanism, indicated at 164, when the clocks are reset in usual manner.

We do not herein further show or describe the time mechanism or its control of the bolt works, nor do we herein claim the same, having shown, described and claimed the same in a copending application on improvements in time lock mechanism, filed by us in the United States Patent Office May 16, 1924, Serial No. 713,771, to which reference is made for a fuller exposition of the same and of the claims to cover the same.

The means for moving the slide 109 for operating the actuating mechanism for the bolts in order to urge the latter into locking relation, are shown as a pinion 167 arranged to mesh with a rack 168 on the slide 109. The pinion is shown releasable. It is exemplified as on a stem 169, provided with a handle 170 for operating the same, and having a bore 171 for being releasably received over a journal-pin 172 extending from the plate 65. When it is desired to place the bolt-work into locking relation, the pinion is inserted over the pivot-pin into mesh with the rack. The slide 109 is moved by rotation of the pinion, whereby the crank-levers 91, 92, are operated for moving the slides 74, 84, in opposite directions, compressing the springs 77, 87, and extending the springs 115, 116.

The bolts will, however, be restrained from any but a slight axial movement by the latch 124, the hook 128 of which engages the lug 129, (see Fig. 5), for connecting the bolts and limiting separation between the same. When the parts are in release relation, as shown in Fig. 4, the latch 124 rests on the lug 129, as shown in Fig. 5, but with the slide 109 in down position, (see Fig. 10), and with a slight space between the hook 128 and the lug. The hook is in position to engage the lug when bolt-locking movement is initiated, to prevent separation between the bolts.

When it is desired to lock the door, the pinion-handle is inserted over the journal-pin 172, and the slide 109 is raised. When this raising movement is initiated, the bell-crank levers 91, 92, begin to move, which movement is cushioned by the springs 77, 87. Slight outward movement of the bolts is caused thereby, but this movement is limited by engagement between the hook 128 and the lug 129, (see Fig. 5), which arrests further outward movements of the bolts.

The movements of the bell-crank levers in locking directions continue by continuing the turning movement of the pinion-handle, whereby the slide 74, 84, are caused to move for compressing the springs 77, 87, and providing spaces between said slides and the respective lugs 72, 82.

During release position of the slide 109, (see Figs. 4 and 10), there is a space 173 between the stem 132 of said slide and the spring 131 on the latch 124. The engagement between the hook 128 and the lug 129 takes place prior to engagement of said spring by said stem, so that said latch is held in place as by friction between the hook and lug, while the compression of the spring 131 is effected by continuing the movement of the slide in bolt-locking direction.

At the final portion of the movement of the slide 109 in locking direction, the arm 134 on the slide will pass into holding engagement with the latches 136, 137, the advancing faces of said parts being suitably slanted, as shown, for readily moving the latches by means of the arm, in order to place the arm in holding relation with the latches. (See Figs. 5, 6 and 7.)

When in this relation, the outer ends of the bolts extend slightly beyond the outer periphery of the door in which they are located, (see Fig. 5). When now the door is to be closed and rotation of the door in locking direction is begun, (see Fig. 6), the outer ends of the bolts are caused to engage inclined faces 173, 174, on the lugs 34, for moving the bolts inward slightly.

This inward movement of the bolts releases the engagement between the hook 128 and the lug 129 of the latching mechanism, whereby the spring 131 will cause raising of the latch away from the lug, to free the bolts from such limiting member, whereby the bolts are free to move outwardly, urged by the springs 77, 87, controlling such outward movement.

When rotation of the door is continued, the lugs thereon being in rear of the lugs on the wall of the door opening, the bolts will be brought into registry with the bolt holes 53, 54, in the wall of the door opening, (see Fig. 7), the bolts being automatically forced into such holes by the action of the springs 77, 87, controlling the same, when such registry is effected, thereby locking the door and placing the release thereof under the control of the releasing mechanism. In this relation the lugs 72, 82, will have moved toward the slides 74, 84. (Compare Figs. 5, 6 and 7.)

The time mechanism will, in the manner stated, operate to release the retaining latches 136, 137, of the holding means, when the time has expired for which the time mechanism is set, thereby causing retraction of the slide 109 and retraction of the bolts 51, 52, by the action of the springs 115, 116.

The various parts of the bolt operating means, the holding means for the operating means, and the actuating means for the holding means, comprise oppositely operating parts, and are arranged to balance each other, and they and the bolt works are so constructed and arranged, that any shocks or jars to which one of the opposing parts may be subjected in a given direction is communicated in the same direction to the opposite corresponding part, and that any shock or jar in unlocking direction upon one of the opposing parts is transmitted as a shock or jar in locking direction upon the corresponding opposing part.

The danger of effecting opening of the door or release of locking relation in any of the mechanism is therefore minimized or avoided.

The bolts, when in locked relation, are independent of each other in unlocking direction, and any shocks or jars tending to move one of the bolts in unlocking direction will also have a tendency to move the opposite bolt in locking direction. All the parts act in unison in unlocking direction when released by the time mechanism, and the springs which operate the bell-cranks aid in forming a non-lockout device, as either may operate to move the bolts into unlocking positions.

The invention comprises few parts of substantial and simple construction and operation, so arranged that ease and permanence of operation is assured.

Having thus fully described our invention, what we claim as new, and desire to secure by Letters Patent, is:

1. The combination with time mechanism, of oppositely movable bolts, oppositely operating bolt-moving elements, and time-lock actuated releasing mechanism for the latter comprising oppositely moving retaining parts moving in opposite directions into holding relation for holding said bolt-moving elements in locking relation and in opposite directions for releasing relation for releasing said bolt moving elements, and said time mechanism having operative connection with said releasing mechanism.

2. The combination with time mechanism, of oppositely movable bolts, oppositely operating bolt-moving elements, resilient means operatively interposed between said respective bolt-moving elements and said respective bolts arranged whereby said oppositely operating bolt-moving elements when moving in bolt-locking directions energize said resilient means to urge said bolts into locking relation, releasing mechanism for said bolt-moving elements comprising oppositely moving members, and means whereby said releasing mechanism is operated by said time mechanism.

3. In locking mechanism for a safe door, the combination of oppositely movable bolts, oppositely operating bolt-moving elements, and resilient means operatively interposed between said respective bolt-moving elements and said respective bolts arranged whereby said oppositely operating bolt-moving elements when moving in bolt-locking directions energize said resilient means to urge said bolts into locking relation.

4. In locking mechanism for a safe door, the combination of oppositely movable bolts, means to resiliently urge said bolts into locking relation, means to hold said bolts in unlocking relation, and means whereby to release said last-named means by relative movement between said bolts in unlocking direction.

5. In locking mechanism for a safe door, the combination of oppositely movable bolts, oppositely operating bolt-moving elements, resilient means operatively interposed between said elements and said bolts to urge said bolts in locking directions, means acting counter to said resilient means to hold said bolts, and means whereby to release said last-named means by relative movement between said bolts in unlocking direction.

6. In locking mechanism for a safe door, the combination of oppositely movable bolts, oppositely operating bolt-moving elements, resilient bolt-operating means to urge said bolts in locking direction, means acting counter to said resilient bolt-operating means to hold said bolts, means whereby to release said last-named means by movement between said bolts in unlocking direction, holding means for said bolt-operating means, retracting means for said bolt-operating means, and time mechanism for releasing said holding means.

7. In locking mechanism for a safe door, the combination of oppositely movable bolts, oppositely operating bolt-moving elements, resilient means to urge said bolts in locking direction, latching means to hold said bolts, and means to urge said latching means into unlatching relation, and constructed and arranged for release of said latching means by movement between said bolts in unlocking direction.

8. In locking mechanism for a safe door, the combination of a bolt, resilient means to urge said bolt in locking direction, resilient moving means for the latter, retaining means to hold said moving means in locking direction, latching means to hold said bolt, means to urge said latching means in unlatching direction, constructed and arranged for release of said latching means by movement of said bolt in unlocking direction, and time mechanism to release said retaining means.

9. In locking mechanism for a safe door, the combination with the door and the wall of the door opening, of oppositely movable bolts, oppositely operating bolt moving elements, resilient means to urge said bolts in locking direction, a latch to limit locking movements of said bolts, an operating part for said bolt moving elements, and a spring between the latter and said latch to urge said latch in unlatching direction, and arranged whereby bolt movement is caused by bolt contact with a part on said wall of the door opening for releasing said latch.

10. In locking mechanism for a safe door, the combination with the door and the wall of the door opening, of oppositely movable bolts, oppositely operating bolt moving elements, resilient means to urge said bolts in locking direction, a latch to limit locking movements of said bolts, an operating part for said bolt moving elements, a spring between the latter and said latch to urge said latch in unlatching direction, arranged whereby bolt movement is caused by bolt contact with a part on said wall of the door opening for releasing said latch, holding means for said operating part, and time mechanism to release said holding means.

11. In locking mechanism for a safe door, the combination of bolts movable in opposite directions for locking relation thereof, a lever for each of said bolts, said levers movable in opposite directions for locking relation, a moving part for said levers, spring means for retracting said levers, a latch between said bolts, and spring means between said moving part and said latch to urge release of said latch.

12. In locking mechanism for a safe door, the combination of bolts movable in opposite directions for locking relation thereof, a lever for each of said bolts, spring means between each of said bolts and its lever, said levers movable in opposite directions for locking relation, a moving part for said levers, spring means for retracting said levers, a latch between said bolts, and spring means between said moving part and said latch to urge release of said latch, and constructed and arranged whereby said latch is released by movement between said bolts in unlocking direction.

13. In locking mechanism for a safe door, the combination of bolts movable in opposite directions for locking relation thereof, a lever for each of said bolts, spring means between each of said bolts and its lever, said levers movable in opposite directions for locking relation, a moving part for said levers, spring means for retracting said levers, a latch between said bolts, spring means between said moving part and said latch to urge release of said latch, constructed and arranged whereby said latch is released by movement between said bolts in unlocking direction, holding parts for said moving part, said holding parts movable in opposite directions for release relation thereof, and means for releasing said holding parts.

In testimony whereof, we have hereunto signed our names.

WILLIAM T. BENHAM.
JOHN E. DWYER.